United States Patent
Doshi et al.

(10) Patent No.: US 8,407,205 B2
(45) Date of Patent: Mar. 26, 2013

(54) AUTOMATING SHARING DATA BETWEEN USERS OF A MULTI-TENANT DATABASE SERVICE

(75) Inventors: Kedar Doshi, Palo Alto, CA (US); Yongsheng Wu, Emeryville, CA (US)

(73) Assignee: salesforce.com, Inc., San Francisco, CA (US)

( * ) Notice: Subject to any disclaimer, the term of this patent is extended or adjusted under 35 U.S.C. 154(b) by 230 days.

(21) Appl. No.: 12/557,797

(22) Filed: Sep. 11, 2009

(65) Prior Publication Data

US 2010/0063959 A1 Mar. 11, 2010

Related U.S. Application Data

(60) Provisional application No. 61/096,289, filed on Sep. 11, 2008.

(51) Int. Cl.
*G06F 17/30* (2006.01)
(52) U.S. Cl. .......................... 707/710; 707/781
(58) Field of Classification Search ............... 707/618, 707/609, 610, 781, 793, E17.005, 704, E17.007
See application file for complete search history.

(56) References Cited

U.S. PATENT DOCUMENTS

| | | | |
|---|---|---|---|
| 5,737,592 A | 4/1998 | Nguyen et al. | |
| 5,794,229 A | 8/1998 | French et al. | |
| 6,112,209 A | 8/2000 | Gusack | |
| 6,173,439 B1 | 1/2001 | Carlson et al. | |
| 6,181,695 B1 * | 1/2001 | Curry et al. | 370/467 |
| 6,275,825 B1 | 8/2001 | Kobayashi et al. | |
| 6,363,400 B1 | 3/2002 | Chtchetkine et al. | |
| 6,377,955 B1 | 4/2002 | Hartmann et al. | |
| 6,487,594 B1 * | 11/2002 | Bahlmann | 707/999.01 |
| 6,587,854 B1 | 7/2003 | Guthrie et al. | |
| 6,611,840 B1 | 8/2003 | Baer et al. | |
| 6,654,039 B1 | 11/2003 | Hollines et al. | |
| 6,687,689 B1 * | 2/2004 | Fung et al. | 707/E17.074 |
| 6,732,100 B1 | 5/2004 | Brodersen et al. | |
| 6,804,680 B2 | 10/2004 | Melli | |
| 6,823,384 B1 | 11/2004 | Wilson et al. | |
| 6,889,231 B1 * | 5/2005 | Souder et al. | 707/999.01 |
| 7,127,460 B2 * | 10/2006 | Nixon et al. | 707/999.008 |
| 7,340,481 B1 | 3/2008 | Baer et al. | |

(Continued)

FOREIGN PATENT DOCUMENTS

| | | |
|---|---|---|
| JP | 2001-014329 | 1/2001 |
| JP | 2004-030221 | 1/2001 |

(Continued)

OTHER PUBLICATIONS

D. Roller, O. Eck and S. Dalakakis—"Integrated version and transaction group model for shared engineering databases"—Data & Knowledge Engineering, vol. 42, Issue 2, Aug. 2002, (pp. 223-245).*

(Continued)

*Primary Examiner* — Anh Ly
(74) *Attorney, Agent, or Firm* — Daryl C. Josephson

(57) ABSTRACT

Systems, methods, and apparatus for automating sharing data between subscribers of a multi-tenant database service. Users or customers associated with one organization that is a tenant of the multi-tenant database system are enabled to share data objects such as leads, opportunities, accounts, contacts, cases, tasks and custom objects, (or other data objects) and other information with their business partners (e.g., users or customers associated with a different organization that is a tenant) and get real-time updates on the shared data.

9 Claims, 12 Drawing Sheets

U.S. PATENT DOCUMENTS

| | | | |
|---|---|---|---|
| 7,434,257 B2 | 10/2008 | Garg et al. | |
| 7,827,138 B2* | 11/2010 | Salmon et al. | 707/610 |
| 2002/0133484 A1 | 9/2002 | Chau et al. | |
| 2002/0174128 A1 | 11/2002 | Govindarajan et al. | |
| 2003/0154197 A1 | 8/2003 | Millet et al. | |
| 2005/0071345 A1* | 3/2005 | Lin | 707/100 |
| 2005/0125430 A1* | 6/2005 | Souder et al. | 707/100 |
| 2005/0182773 A1* | 8/2005 | Feinsmith | 707/100 |
| 2005/0223022 A1 | 10/2005 | Weissman et al. | |
| 2005/0240621 A1* | 10/2005 | Robertson et al. | 707/102 |
| 2006/0161554 A1* | 7/2006 | Lucovsky et al. | 707/10 |
| 2006/0206449 A1* | 9/2006 | Fletcher et al. | 707/1 |
| 2006/0235715 A1* | 10/2006 | Abrams et al. | 705/1 |
| 2007/0130130 A1* | 6/2007 | Chan et al. | 707/3 |
| 2008/0082586 A1* | 4/2008 | Jasik et al. | 707/200 |
| 2008/0201701 A1* | 8/2008 | Hofhansl et al. | 717/168 |
| 2009/0013011 A1* | 1/2009 | Barker et al. | 707/203 |
| 2009/0030906 A1* | 1/2009 | Doshi et al. | 707/9 |
| 2009/0049053 A1* | 2/2009 | Barker et al. | 707/10 |
| 2010/0063959 A1* | 3/2010 | Doshi et al. | 707/781 |
| 2010/0235837 A1* | 9/2010 | Weissman et al. | 707/781 |

FOREIGN PATENT DOCUMENTS

| | | |
|---|---|---|
| WO | WO 01/77787 | 10/2001 |

OTHER PUBLICATIONS

Charles Phillips and Mary Meeker—"The B2B Internet Report Collaborative Commerce"—Morgan Stanley Dean Witter—Equity Research, North America—Apr. 2000 (pp. 1-113).*

U.S. Appl. No. 60/828,192, filed Oct. 4, 2006, for Craig Weissman.

* cited by examiner

FIG. 3

| | Partner Contacts | | | New Contact | Add to Connections | Save Contact | Connections | | |
|---|---|---|---|---|---|---|---|---|---|
| | A\|B\|C\|D\|E\|F\|G\|H\|I\|J\|K\|L\|M\|N\|O\|P\|Q\|R\|S\|T\|U\|V\|W\|X\|Y\|Z | | | | | | Other All | | |
| Action | Name ⌄ | Account Name | Title | | Phone | | Salesforce User? | | Contact On |
| ☐ Edit \| Del | O. Corsino | | CFO | | (873) 409-9901 | | Yes | | AUser |
| ☐ Edit \| Del | O. IBaglyos | | Receptionist | | (257) 586-9926 | | Yes | | AUser |
| ☐ Edit \| Del | Abbott, Dan | | Co-Founder | | (474) 451-3351 | | Yes | | AUser |
| ☐ Edit \| Del | Abrahamsohn, George | | Founder | | (502) 205-4974 | | Yes | | AUser |
| ☑ Edit \| Del | Aced, Steve | | CEO | | (733) 887-2063 | | Inquire | | AUser |
| ☐ Edit \| Del | Adams, James | 1001 Home Service | Senior QA Engineer | | (948) 406-2740 | | No | | AUser |
| ☐ Edit \| Del | Ahl, Steve | | | | (183) 210-5246 | | Yes | | AUser |
| ☐ Edit \| Del | Alva, Ken De | | Secretary | | (810) 425-9301 | | No | | AUser |
| ☑ Edit \| Del | Alcaraz, John | | | | (619) 611-4748 | | Inquire | | AUser |
| ☑ Edit \| Del | Alexander, Ross | | | | (317) 876-5372 | | No | | AUser |
| ☑ Edit \| Del | Alfaro, Robert | | | | (150) 654-4764 | | Inquire | | AUser |
| ☐ Edit \| Del | Alger, Jack | | | | (213) 254-6658 | | Yes | | AUser |
| ☐ Edit \| Del | Allen, Mel | | Junior QA Engineer | | (365) 807-3947 | | No | | AUser |
| ☐ Edit \| Del | Allen, Richard | | | | (721) 579-1527 | | Yes | | AUser |
| ☐ Edit \| Del | Almen, Brian Von | 110/220 Volt Electric | | | (402) 453-1811 | | Yes | | AUser |
| ☐ Edit \| Del | Alonso, Frannk | | | | (364) 981-3789 | | Yes | | AUser |
| ☐ Edit \| Del | Alukay, Sam | | test | | (158) 779-8888 | | Yes | | AUser |
| 1-100 of 1002 | 4 Selected | | Next | | | | Page 1 of 11 | | |

FIG. 4A

Select connection or connections which may accept this record when forwarded.

| Save | Save & New | Cancel |

Select Connections

❙ = Required Information

To  ❙ Available Connections           Selected Connections

Company 1                                  Company 3
Company 2
Company 4

Add ▲
Remove ▼

☑ Send Notification Email (new invitees only)

Forward existing related records

Only actively published and subscribed related objects will be forwarded.  More info

Select All | Deselect All
☐ Claims (4)
☐ Certifications (2)
☐ Opportunities (4)
☐ Tasks: Open (2)
☐ Tasks: Closed (4)

| Save | Save & New | Cancel |

FIG. 4B

Workflow Action
Stop Sharing with Connections　　　　　　　　　　　　　　　　　Help for this Page ⓘ

External sharing of a record can be automatically stopped by a workflow action. Since a record may be both received from and sent to a connected company, you may indicate which connection relationships you wish to stop.

[Save] [Cancel]

If workflow rule criteria are met...

◉ Stop sharing with ALL connections

○ Stop sharing with connections from which the record was RECEIVED

○ Stop sharing with connections to which the record was SENT.

☐ Stop Sharing child records

[Save] [Cancel]

FIG. 4C

New Invitation

Help for this Page ⓘ

Save & Send Invite    Cancel

| = Required Information

Connect to...

Contact | James Mullen ⓘ

Account   Western Widgets ⓘ

Our company is represented by...

Connection Owner | Erin Leigh ⓘ

Connection template (optional)

Template ⓘ

To reduce the repetitiveness of publishing objects and fields, a connection template can be applied to the invite....

Save & Send Invite    Cancel

FIG. 5E

Sharing rules can only be used to grant wider access to data, not to restrict access.

Lead Sharing Rule [Save] [Cancel]

Share Records Based On

Leads owned by [All Users ▼] [---- Select One ----]    610

▽ Additional Criteria

| Object | Field | Operator | Value | |
|---|---|---|---|---|
| --None-- ▼ | --None-- ▼ | --None-- ▼ | | AND |
| --None-- ▼ | --None-- ▼ | --None-- ▼ | | AND |
| --None-- ▼ | --None-- ▼ | --None-- ▼ | | AND |
| --None-- ▼ | --None-- ▼ | --None-- ▼ | | AND |
| --None-- ▼ | --None-- ▼ | --None-- ▼ | | AND |

Add Row Remove Row

Clear Filter Conditions

Tips

Example: if you wanted to filter to key deals for your company, where key deals are deals over $1,000,000 that are closing in the next 45 days, or deals owned by a VP, you would set up your filters as follows    620

ALL OPPORTUNITIES

Advanced Filters:
| | Field | Operator | Value |
|---|---|---|---|
| 1. | Amount ▼ | greater than ▼ | 1000000 |
| 2. | Closed Date ▼ | equals ▼ | 1000000 |
| 3. | Owner Role ▼ | starts with ▼ | VP |

Advanced Filter Conditions: (1 AND 2) OR 3

Amount > $1M

Close Date next 45 days

Deals owned by a VP 1 and 2    3

RESULT

Share Records With

| Available Users | | Select Users to Share With |
|---|---|---|
| [All Users ▼] | Add ▶ | |
| All Users | ◀ Remove | |

630

Access Level [Read Only ▼]

[Save] [Cancel]    600

FIG. 6

AUTOMATING SHARING DATA BETWEEN USERS OF A MULTI-TENANT DATABASE SERVICE

CROSS-REFERENCES TO RELATED APPLICATIONS

The present application claims priority to and is a nonprovisional application of U.S. Provisional Patent Ser. No. 61/096,289 filed Sep. 11, 2008, the disclosure of which is hereby incorporated by reference in its entirety for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to database systems, and more particularly to automating sharing data between users or subscribers of a multi-tenant database service.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. This has advantages in that a company will easily be able to keep certain data private from others users of the database. However, if a company or organization wants to interact with another company or organization, the use of such an independent database may become a determinant. Multi-tenant database services such as provided by salesforce.com allow for multiple organizations' data to be stored on a single database. However, security restrictions prevent data for one organization from being accessed by users that are not associated with that organization.

Accordingly, it is desirable to provide systems and methods that allow companies or organizations to easily share information in a multi-tenant database service.

BRIEF SUMMARY

In accordance with embodiments, there are provided systems, methods, and apparatus for automating sharing data between users or subscribers of a multi-tenant database service.

Embodiments described herein allow users or customers associated with one organization that is a tenant of the multi-tenant database system to share data objects such as leads, opportunities, accounts, contacts, cases, tasks and custom objects, (or other data objects) and other information with their external business partners (e.g., users or customers associated with a different organization that is a tenant) and get real-time updates on the shared data. The functionality and design of the connectivity and sharing model is based on standards such as XML, W3C, etc.

According to one embodiment, a method is provided for automatically sharing data between users or subscribers to a multi-tenant database service. The method typically includes receiving a specification of at least one sharing rule from a first subscriber to a multi-tenant on-demand database service, the first subscriber being associated with a first organization that shares database resources of the multi-tenant on-demand database service with a second organization, and automatically evaluating the sharing rule to identify whether a data record of a first data object accessible to the first subscriber is to be shared with a second subscriber of the second organization that does not have access to the data record, and if so automatically sharing the data record with the second subscriber. In certain aspects, sharing includes updating a sharing table that includes pointers to records stored in relation to pointers to subscribers. In certain aspects, sharing includes updating a second database object of the second subscriber to include a copy of the data record. In certain aspects, the method further includes synchronizing the copy of the data record in the second database object with the data record of the first database object. In certain aspects, synchronizing includes automatically updating the copy of the data record in the second database object responsive to the data record of the first database object being modified by the first subscriber. In certain aspects, synchronizing includes automatically updating the copy of the data record in the second database object responsive to the data record being modified in the first database object in response to a workflow rule, or a trigger. In certain aspects, automatically sharing includes sending a notification to the second subscriber, and sharing the data record responsive to an indication of acceptance from the second subscriber.

According to another embodiment, a method is provided for automatically sharing data between subscribers to a multi-tenant database service. The method typically includes receiving a request to share data of a first subscriber to an on demand database service with at least one second subscriber to the on-demand database service, the request including at least one rule, wherein the first subscriber and second subscriber do not share access to the others data, and automatically determining whether a data record accessible by the first subscriber is to be shared with the second subscriber based at least in part on application of the at least one rule, and if so automatically sharing the data record of the first subscriber with the at least one second subscriber.

According to yet another embodiment, a tangible computer readable medium is provided that stores code for automatically sharing data between subscribers to a multi-tenant database service. The code typically includes instructions, implemented by one or more processors, to receive a specification of at least one sharing rule from a first subscriber to a multi-tenant on-demand database service, the first subscriber being associated with a first organization that shares database resources of the multi-tenant on-demand database service with a second organization, and to automatically evaluate the sharing rule to identify whether a data record of a first data object accessible to the first subscriber is to be shared with a second subscriber of the second organization that does not have access to the data record, and if so to automatically share the data record with the second subscriber.

According to a further embodiment, a multi-tenant on demand database system is provided. The system typically includes a database that stores database objects for a plurality of organizations/tenants, wherein users of each tenant only have access to data base objects associated with that tenant, and a server configured with control logic, which when executed, causes the server to receive a specification of at least one sharing rule from a first subscriber to a multi-tenant on-demand database service, the first subscriber being associated with a first organization that shares database resources of the multi-tenant on-demand database service with a second organization, and to automatically evaluate the sharing rule to identify whether a data record of a first data object accessible to the first subscriber is to be shared with a second subscriber of the second organization that does not have access to the data record, and if so to automatically share the data record with the second subscriber.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

In the following drawings like reference numbers are used to refer to like elements. Although the following figures depict various examples of the invention, the invention is not limited to the examples depicted in the figures.

FIG. 3 illustrates an example of a UI server that allows a sharing user to specify a connection (e.g., external user or user group) to which to share one or more records according to one embodiment.

FIG. 4*a* illustrates an example of a UI screen that allows a sharing user to identify one or more records to be shared with a connection; FIG. 4*b* illustrates an example of a UI screen that allows a sharing user to specify one or more corrections to which the record(s) identified in FIG. 4*a* should be shared; FIG. 4*c* illustrates a UI that allows a user to explicitly stop sharing a record.

FIGS. 5*a*-5*e* illustrate example UI screenshots that allow a user to manage templates for sharing records according to one embodiment.

FIG. 6 illustrates a UI screen shot for creating/editing a CBS rule according to one embodiment.

DETAILED DESCRIPTION

General Overview

Systems and methods are provided for sharing data with external users. These techniques for sharing data can enable sharing with users of a multi-tenant database system who are external (e.g., not associated with the database).

As used herein, the term multi-tenant database system or service refers to those systems in which various elements of hardware and software of the database system may be shared by one or more customers. For example, a given application server (e.g. running an application process) may simultaneously process requests for a great number of customers, and a given database table may store rows for a potentially much greater number of customers. As used herein, the term query plan refers to a set of steps used to access information in a database system.

Next, mechanisms and methods for providing access to and sharing of objects among users of a multi-tenant database system will be described with reference to example embodiments.

System Overview

Figure 1:
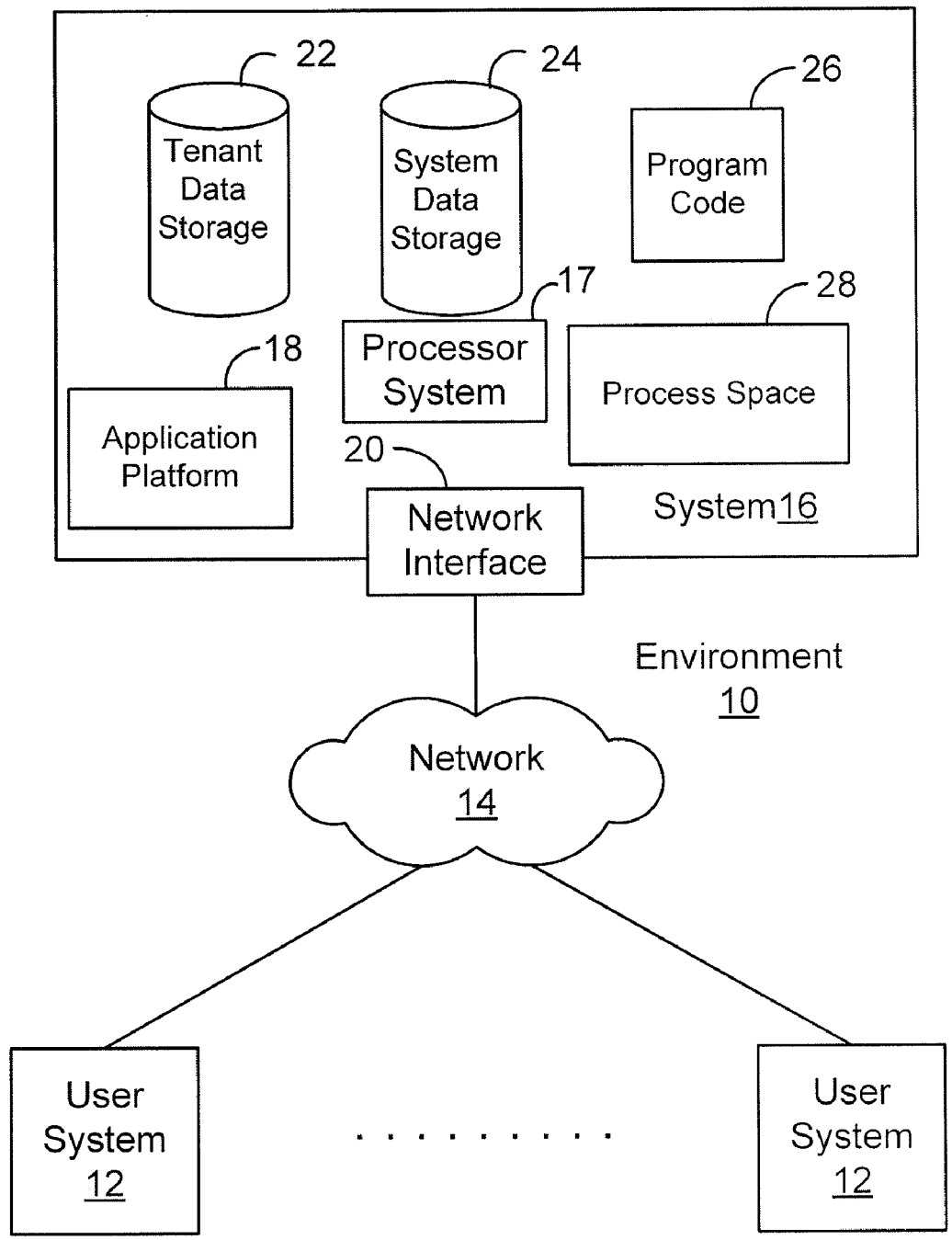
FIG. 1 illustrates a block diagram of an environment wherein an on-demand database service might be used.

FIG. 1 illustrates a block diagram of an environment 10 wherein an on-demand database service might be used. Environment 10 may include user systems 12, network 14, system 16, processor system 17, application platform 18, network interface 20, tenant data storage 22, system data storage 24, program code 26, and process space 28. In other embodiments, environment 10 may not have all of the components listed and/or may have other elements instead of, or in addition to, those listed above.

Environment 10 is an environment in which an on-demand database service exists. User system 12 may be any machine or system that is used by a user to access a database user system. For example, any of user systems 12 can be a handheld computing device, a mobile phone, a laptop computer, a work station, and/or a network of computing devices. As illustrated in FIG. 1 (and in more detail in FIG. 2) user systems 12 might interact via a network 14 with an on-demand database service, which is system 16.

An on-demand database service, such as system 16, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 16" and "system 16" will be used interchangeably herein. A database image may include one or more database objects. A relational database management system (RDMS) or the equivalent may execute storage and retrieval of information against the database object(s). Application platform 18 may be a framework that allows the applications of system 16 to run, such as the hardware and/or software, e.g., the operating system. In an embodiment, on-demand database service 16 may include an application platform 18 that enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP messages to and from an HTTP server at system 16. Such an HTTP server might be implemented as the sole network interface between system 16 and network 14, but other techniques might be used as well or instead. In some implementations, the interface between system 16 and network 14 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 16, shown in FIG. 1, implements a web-based customer relationship management (CRM) system. For example, in one embodiment, system 16 includes application servers configured to implement and execute CRM software applications (application processes) as well as provide related data, code, forms, web pages and other information to and from user systems 12 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of system 16 is shown in FIG. 1, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1 include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 12 and all of its components are operator configurable using applications, such as a browser, including computer code run using a central processing unit such as an Intel Pentium® processor or the like. Similarly, system 16 (and additional instances of an MTS, where more than one is present) and all of their components might be operator configurable using application(s) including computer code to run using a central processing unit such as processor system 17, which may include an Intel Pentium® processor or the like, and/or multiple processor units. A computer program product embodiment includes a tangible, machine-readable storage medium (media) having instructions stored thereon/in which can be used to program a computer to perform any of the processes of the embodiments described herein. Computer code for operating and configuring system 16 to intercommunicate and to process web pages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
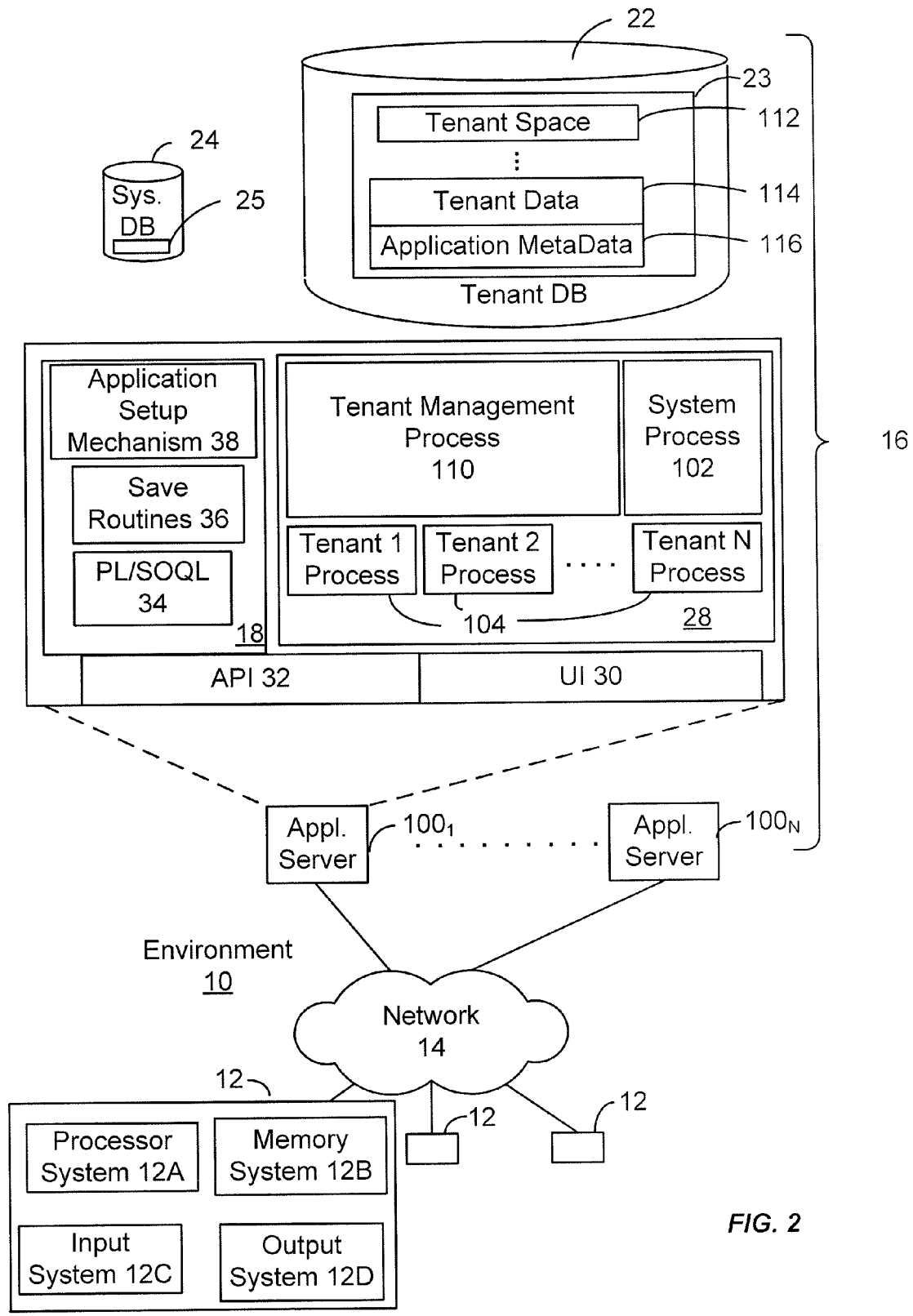
FIG. 2 illustrates a block diagram of an embodiment of elements of FIG. 1 and various possible interconnections between these elements according to an embodiment of the present invention.
Figure 5A:
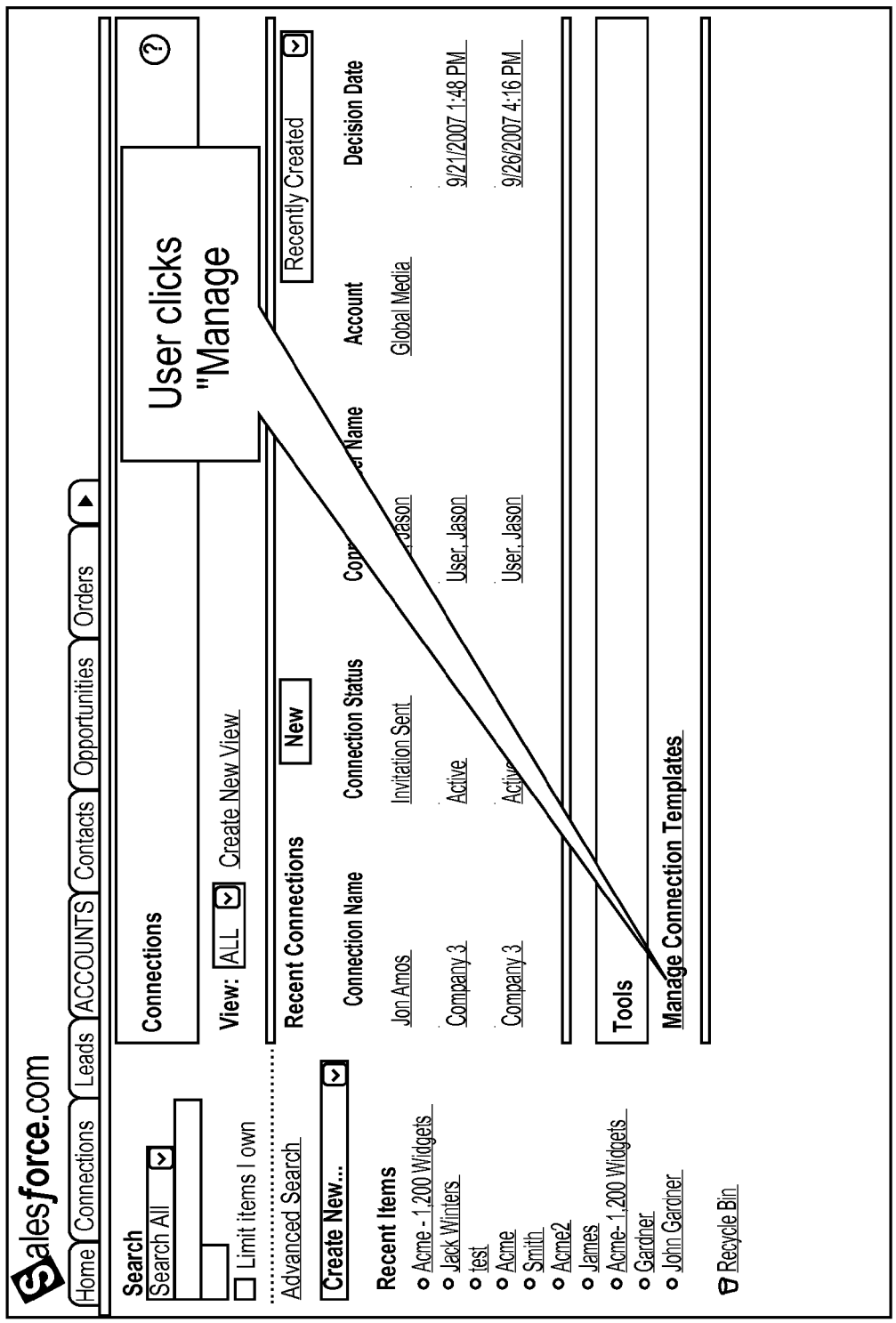
Figure 5B:
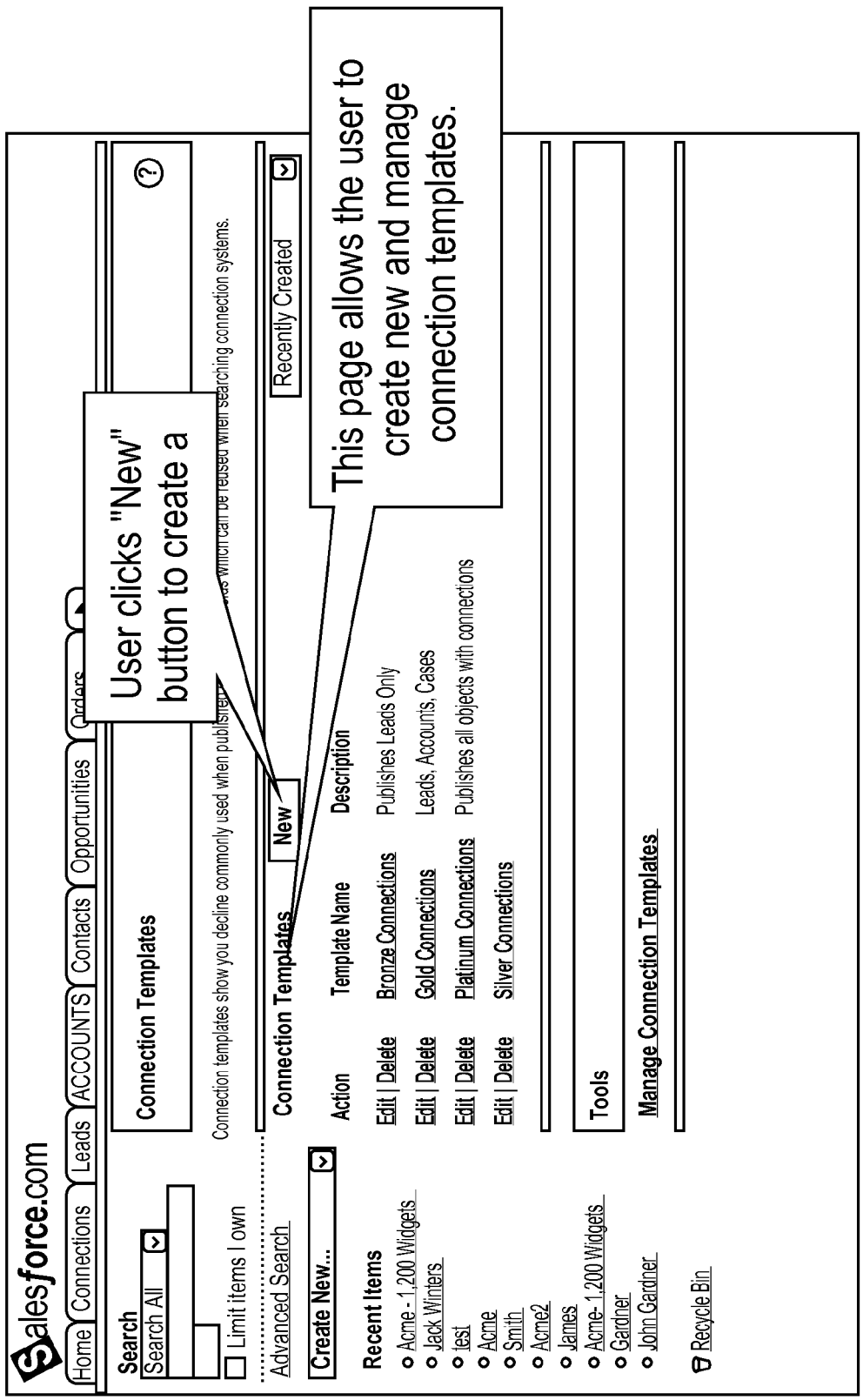
Figure 5C:
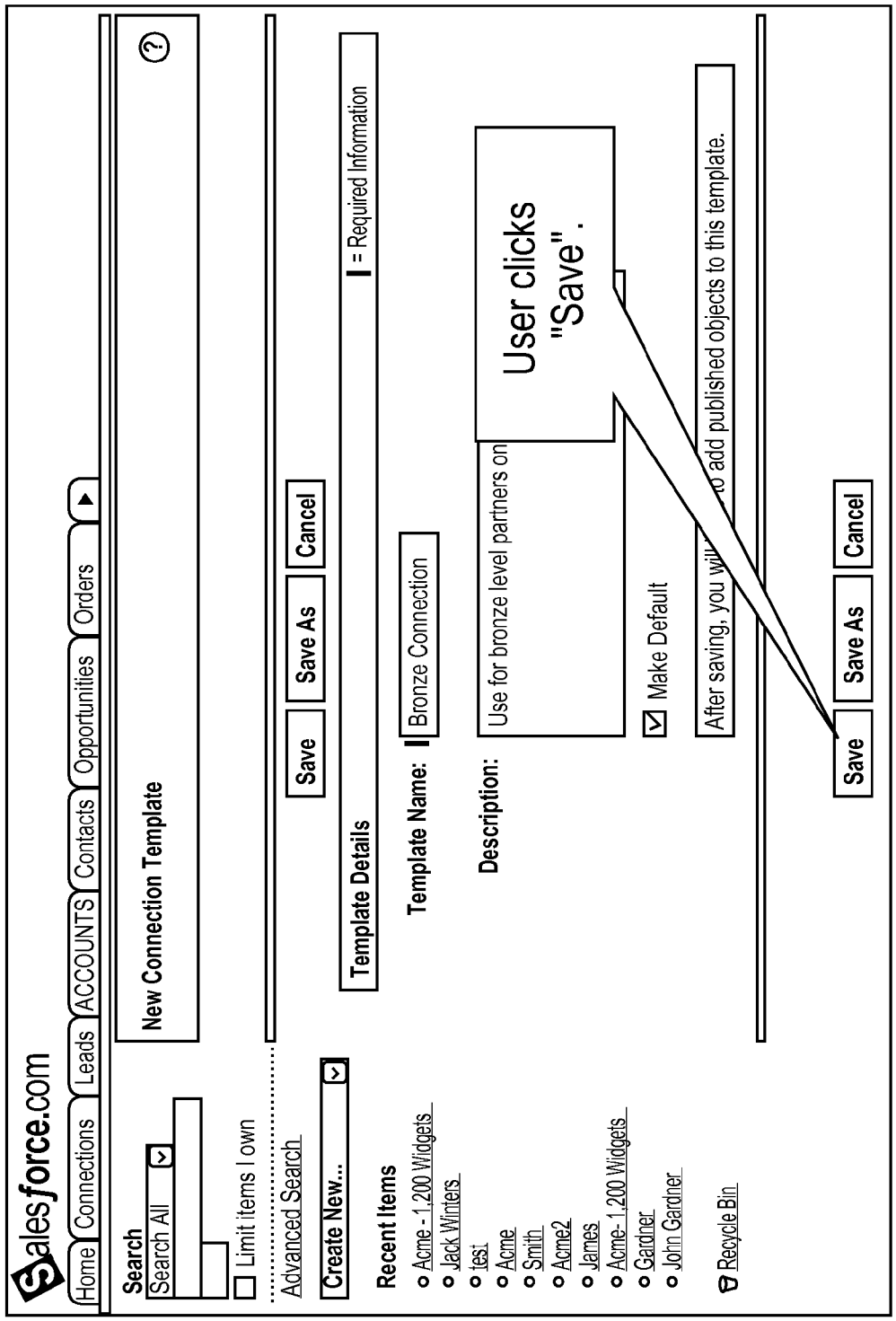
Figure 5D:
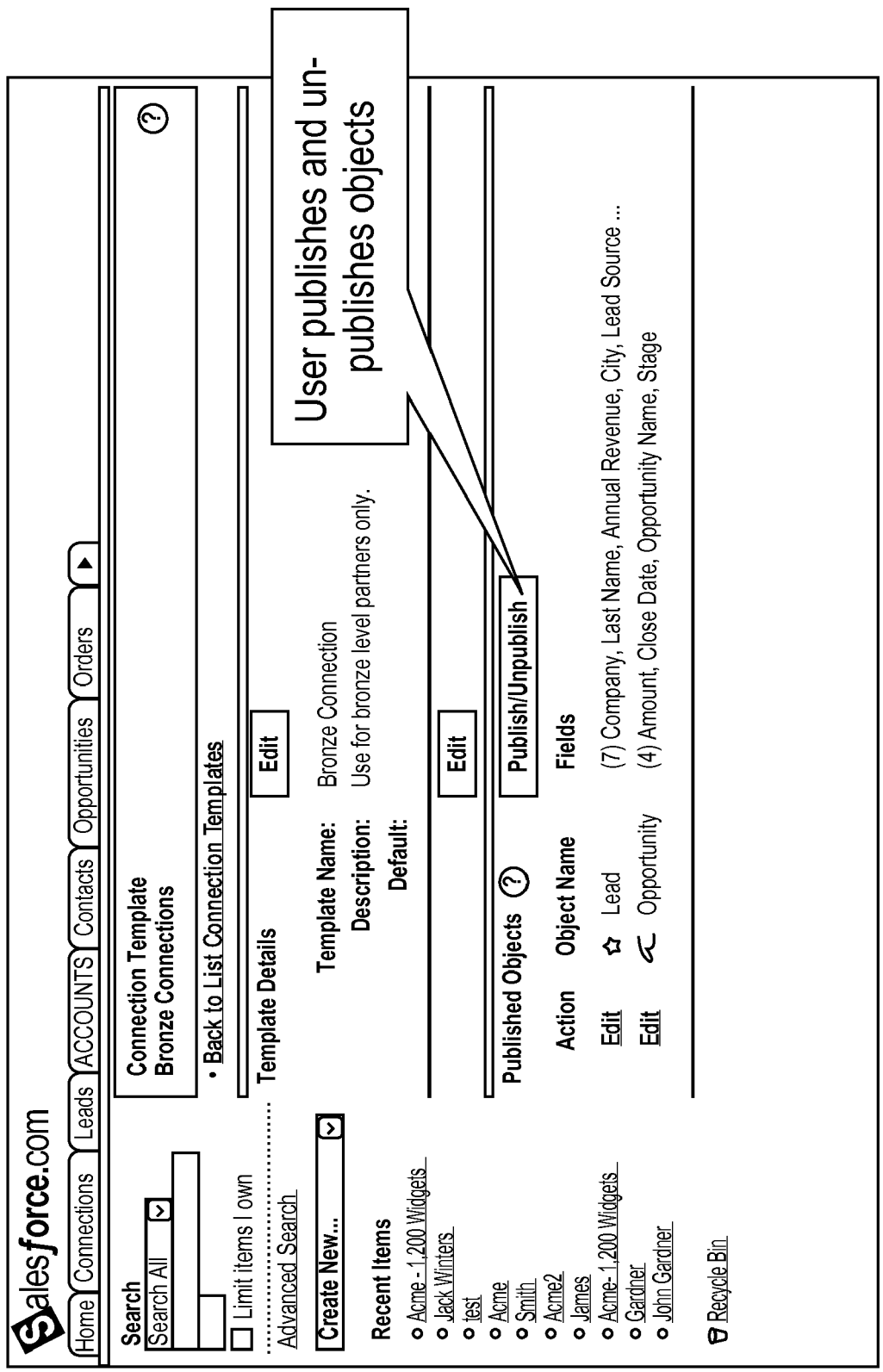

FIG. 2 also illustrates environment 10. However, in FIG. 2 elements of system 16 and various interconnections in an embodiment are further illustrated. FIG. 2 shows that user system 12 may include processor system 12A, memory system 12B, input system 12C, and output system 12D. FIG. 2 shows network 14 and system 16. FIG. 2 also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers $100_1$-$100_N$, system process space 102, tenant process spaces 104, tenant management process space 110, tenant storage area 112, user storage 114, and application metadata 116. In other embodiments, environment 10 may not have the same elements as those listed above and/or may have other elements instead of, or in addition to, those listed above.

User system 12, network 14, system 16, tenant data storage 22, and system data storage 24 were discussed above in FIG. 1. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 2, system 16 may include a network interface 20 (of FIG. 1) implemented as a set of HTTP application servers 100, an application platform 18, tenant data storage 22, and system data storage 24. Also shown is system process space 102, including individual tenant process spaces 104 and a tenant management process space 110. Each application server 100 may be configured to tenant data storage 22 and the tenant data 23 therein, and system data storage 24 and the system data 25 therein to serve requests of user systems 12. The tenant data 23 might be divided into individual tenant storage areas 112, which can be either a physical arrangement and/or a logical arrangement of data. Within each tenant storage area 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage area 112. A UI 30 provides a user interface and an API 32 provides an application programmer interface to system 16 resident processes to users and/or developers at user systems 12. The tenant data and the system data may be stored in various databases, such as one or more Oracle™ databases.

Application platform 18 includes an application setup mechanism 38 that supports application developers' creation and management of applications, which may be saved as metadata into tenant data storage 22 by save routines 36 for execution by subscribers as one or more tenant process spaces 104 managed by tenant management process 110 for example. Invocations to such applications may be coded using PL/SOQL 34 that provides a programming language style interface extension to API 32. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server $100_1$ might be coupled via the network 14 (e.g., the Internet), another application server $100_{N-1}$ might be coupled via a direct network link, and another application server $100_N$ might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain embodiments, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one embodiment, therefore, an interface system implementing a load balancing function (e.g., an F5 Big-IP load balancer) is communicably coupled between the application servers 100 and the user systems 12 to distribute requests to the application servers 100. In one embodiment, the load balancer uses a least connections algorithm to route user requests to the application servers 100. Other examples of load balancing algorithms, such as round robin and observed response time, also can be used. For example, in certain embodiments, three consecutive requests from the same user could hit three different application servers 100, and three requests from different users could hit the same application server 100. In this manner, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain embodiments, user systems 12 (which may be client systems) communicate with application servers 100 to request and update system-level and tenant-level data from system 16 that may require sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

A table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc.

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system.

Automated Sharing

According to an various embodiments, a user is provided with the ability to share objects and related lists with other users. In certain embodiments, a user is able to share objects and related information with users that are external to their own company or organization, e.g., with users associated with a company or organization different and distinct from the sharing user's company or organization.

In certain aspects, both custom objects and standard objects are sharable. Also, customers (e.g., users of an organization or company that uses the multi-tenant database service) are provided with the ability to share related list records either when sharing a record with a connection manually, one at a time or in mass, or automatically. Common examples include sharing invoices when sharing a related opportunity or account record.

In one embodiment, users (e.g., customers) are provided with an option to use and define sharing rules and/or with the ability to take action from a list view of records to allow customers to automatically share one or more records to connections (identified external users).

In one embodiment, sharing based on rules is provided through a user interface (UI) that allows users to specify one or more external users and the criteria (set of one or more rules or filters) that when evaluated identify one or more records to automatically share with the one or more user-specified external users (also referred to herein as a connection or connections). When established, a rules engine evaluates the stored rules/filters to identify record(s) to be shared and populates a sharing table (e.g., by inserting rows into the table identifying users and records to be shared to those users). The data record(s) identified in the sharing table are copied to the database of the external user(s) and changes to a shared record are kept synchronized with the copy in the external user's(s') database. In certain aspects, the rules are evaluated in real time, e.g., each time a record is modified by a CRUD operation by the sharing user or otherwise modified by the sharing user's database system, for example, by way of automatic workflow rules or trigger actions. In certain aspects, rules are evaluated off-line in bulk when modified. For example, modified rules are processed in bulk at off-peak hours by evaluating the rules against all records in the database to determine whether the sharing table entries should be modified.

Figure 3:
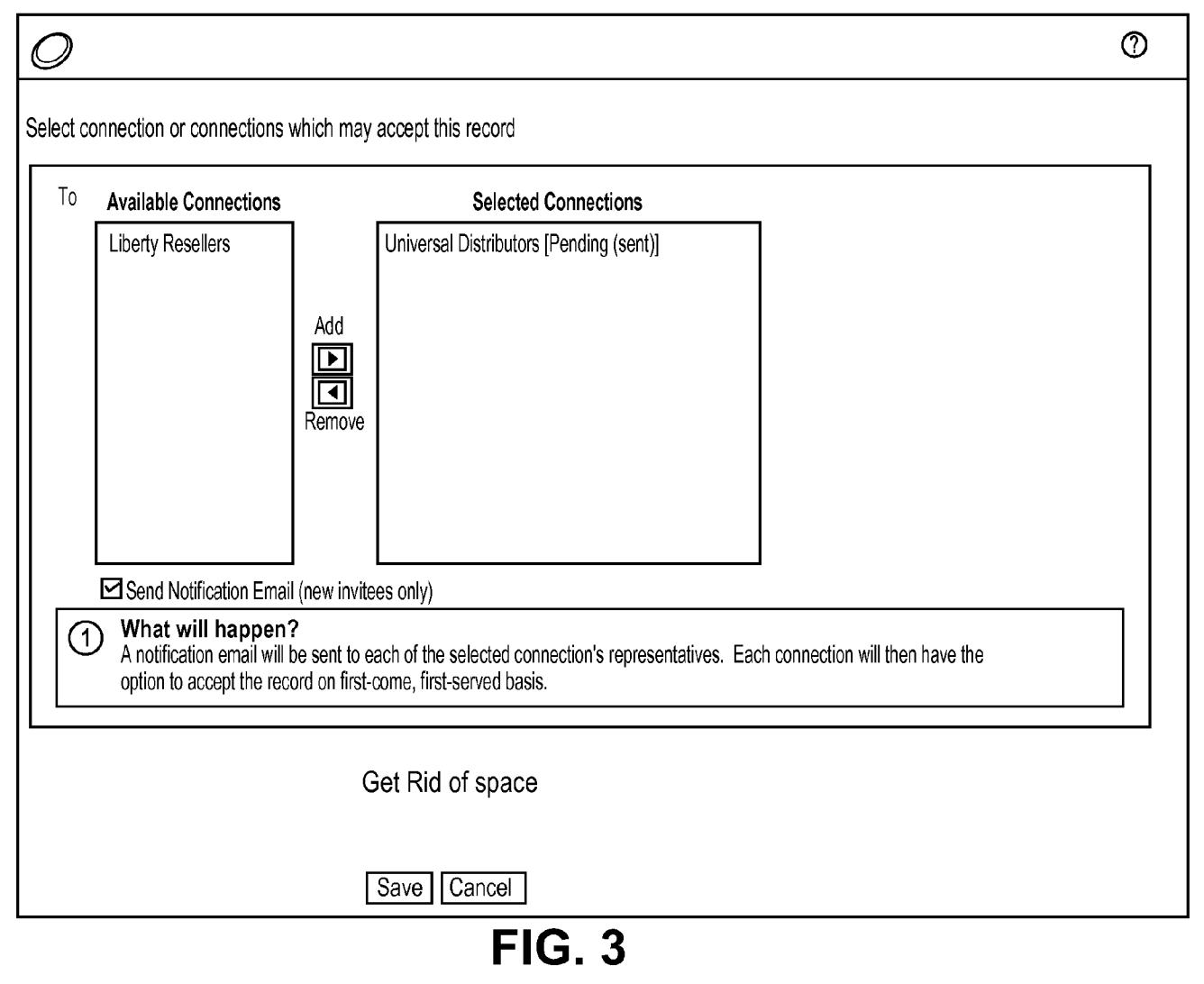

In certain aspects, only parent objects may be shared to reduce processing resource consumption. However, in other aspects, related objects are able to be shared as will be discussed in more detail below with reference to "deep share" technology. In one aspect, deep share provides the ability to traverse the parent object, check sharing relationships and then share the child record(s) (e.g. on opportunity check if Account is shared with a specific connection and if yes and if certain other opportunity conditions apply then share the opportunity). In certain aspects, sharing to a connection is explicit (by sender and accepted by receiver) and the system does not share records that have been shared and then stop shared manually (by a user). FIG. 3 illustrates an example of a UI server that allows a sharing user to specify a connection (e.g., external user or user group) to which to share one or more records.

In one embodiment, a List View selection and sharing action is provided that allows a user to select from a list of records to share with one or more external users. In one aspect, a customer/user has the ability to create list views based on defined filter criteria and share/stop sharing one or more records with connection (s).

FIG. 4a illustrates an example of a UI screen that allows a sharing user to identify one or more records to be shared with a connection. FIG. 4b illustrates an example of a UI screen that allows a sharing user to specify one or more corrections to which the record(s) identified in FIG. 4a should be shared. FIG. 4c illustrates UI that allows a user to explicitly stop sharing a record.

Custom Templates

In certain aspects, customers are provided with the ability to create templates that define all the publish rules (e.g., object and field) and use these templates when setting up connections. In one embodiment, if a template is already in use and is modified, an 'Update Connections' option can update the publish rules on all related connections. In one aspect, only the difference is updated. In another aspect, the system does not unpublish all objects/fields)

FIGS. 5a-5e illustrate example UI servers that allow a user to manage templates for sharing records.

CBS (Criteria Based Sharing) with External Users

In one Embodiment sharing is owner driven using criteria based sharing (CBS) rules that are defined by a sharing user. Sharing rules may not only be based on owner, but they may be based also using the other fields in an entity or object, for example, sharing all the accounts with owner in "Public Group A" and "Name" equals "Acme". Exposing data on portals/sites is a very useful aspect of CBS, for instance, customer portal users can view "published" solutions.

Detailed CBS Description

In this section, we will discuss what fields may appear in the filter of criteria based sharing rule; two modes in which criteria based sharing rules are fired or triggered for evaluation, and how a sharing table is maintained in each mode.

Possible Restrictions of Filter Item

In one aspect, filter items in criteria based sharing rules are made as flexible as possible, for example, to allow the system to make cross-entity (object) field references when defining the criteria, so that one can define a CBS rule like sharing all the opportunities with the parent accounts in "Banking" industry to "Financial Services Sales Group". When this type of filter item is enabled, every time the value of a field in one entity changes, all the other entities that have a foreign key relationship with that entity need to be found. A all the CBS rules of those entity types' are re-evaluated in one aspect, however, this can be very expensive, depending on how many entities have foreign key relationship to that entity, how many CBS rules there are for those entities, and how many records there are for those entities.

In one aspect, references to lookup fields within the entity itself are not allowed when defining filter items, because when the parent entity gets deleted, the lookup field in the children entities could be cascadingly set to NULL, which may be hard coded in PL/SQL, and that makes it hard to detect the change and do incremental maintenance of sharing rows. In certain aspects, however, there are exceptions to this restriction, including for example:
 1. field lookup to user, because users are never deleted
 2. field lookup to queue, because queue cannot be deleted when referenced anywhere else
 3. field lookup to record type, because record type cannot be deleted when referenced in the system In another aspect, a currency field is not allowed as a filter, because if dated currency is enabled, any change made to exchange rate could trigger re-evaluation of large number of CBS rules. However, as this can be deemed as a rare event in the system, this restriction is relaxed in certain aspects.

In certain aspects, reference to formula fields may be undesirable, because complicated formula could lead to long SQL when criteria are converted to WHERE clause conditions, and whenever the formula field definition is changed, a potentially large number of CBS rules need to be recalculated. Again, since these can be considered as rare events, this restriction is relaxed in certain aspects.

CBS Rule—Criteria Evaluation

In one embodiment, when a CBS rule is first created, or when the rule filter item changes, the rule is evaluated against all the records of the entity type. Where each individual record of the entity type is edited, the CBS rules only need be evaluated against that record. These two scenarios may have very different performance indications, and therefore may need to be treated differently.

Consider the circumstance where an individual record get changed. In this case, the workflow rule evaluation engine or formula evaluation engine can be leveraged to evaluate that record against all the CBS rules of the corresponding entity type, e.g., in the JAVA layer. Since Udd provides a way to get the original copy of a record before any changes are made on it, it is known if the record complies with the CBS rules before vs. after, and a share row can be added or deleted in the corresponding share table. In some cases it may be desirable to do this right before the changes are committed to the database to avoid multiple rule evaluation and corresponding share table maintenance, since the record can be changed at various stages of update operations, such as triggers, workflow rule actions, etc. One potential complication that needs to be called out in this scenario is that a CBS rule also has owner group membership based criterion, which cannot be evaluated without a separate round trip to the database, while the remaining criteria can be easily evaluated with the field values in the same entity object. Because there could be multiple CBS rules in place for a particular entity type, bulkification can be used for group membership testing to improve performance, and this will help bulk update operations as well. In certain aspects, it may also be advantageous to leave group membership testing to the end of the evaluation, since if the connector of owner group membership criterion and the rest criteria is "AND", there are chances where redundant group membership criterion evaluation can be avoided altogether.

In the other scenario, where CBS rules are first defined, or the rule filter item changes, that (new or changed) rule is evaluated against all the records of that entity type. It would be inefficient if the same approach above were used; instead, in one embodiment, a SELECT statement is generated based on the criteria defined in the CBS rule, and share rows are maintained in the corresponding share table based on the result set from the SELECT statement generated. Using an existing infrastructure that generates WHERE clause conditions based on formula (e.g., CBS criteria can be stored as formula internally), the final SELECT statement can be constructed based on that, because only group membership testing conditions need be appended on top of those conditions. To address the problem where there could potentially be a large number of entity records returned from the SELECT statement, a PK chunking condition is appended to the query generated, in one aspect.

Firing CBS Rules

In one embodiment, evaluation of an original owner based sharing rule (e.g., triggering or firing of a rule) involves a join between an entity table, an entity sharing rule table, and one or more group membership tables based on the condition of group membership of the entity owner's. The same join and WHERE clause conditions can be used to evaluate all the owner-based sharing rules at once, therefore, owner-based sharing rules can be evaluated very efficiently. Different owner-based sharing rules may result in sharing rows for the same target group, in that case, according to one embodiment, only the one with the maximum access level will be kept in the system. In the other words, the sharing rows resulting from evaluation of multiple owner-based sharing rules may collapses with each other into one row. There are pros and cons for this approach: overall, it results in less number of sharing rows being written to the sharing table, and thus saves physical storage, and when it is time to evaluate sharing access for a given user, there are a smaller number of sharing rows to consider. However, when it is time to maintain sharing rows from owner-based sharing rules, multiple sharing rules could refer to the same target share-to group. For example, when a sharing rule is deleted or downgraded, the corresponding share rows resulted from this sharing rule cannot be deleted or downgraded, because it could be collapsed with the result from other sharing rules; the same goes for inserting or upgrading the access level of a sharing rule—it could upgrade an existing share row in the sharing table, or it could result in adding new sharing row to the corresponding sharing table.

As for CBS rules, because they include owner group membership testing as well as other criteria based on other fields of the entity, it may no longer possible in some cases to derive all the possible share rows from all CBS rules using a join between an entity table, a share rule table, and group membership table(s). Therefore, in one embodiment, these rules are evaluated one by one. This may cause inefficiencies if many CBS rules use the same target shared to group, because when one rule get changed/deleted, the other rules would need to be evaluated one-by-one to figure out an existing share row or rows in the share table can be deleted or downgraded. Also, with the existing sharing rules, if one wants to share to multiple groups for the same criteria, multiple sharing rules need top be created, one for each target group. Since CBS rules need to be evaluated one by one, this could result in an unnecessary performance penalty. To solve this problem, according to one embodiment, the concept of anonymous groups is added to the system: for every CBS rule in the system, an anonymous group is created on behalf of the real groups to which data is shared ("shared_to groups"), which contains the real shared_to groups (one or multiple) as its group members. This way, multiple target groups can be supported in one CBS rule, and more importantly, sharing maintenance is easily performed, much more efficiently, because now every sharing row caused by a CBS rule has a unique target group associated with it. If a CBS rule gets created, only new rows are added to the corresponding sharing table; if a CBS rule gets changed, when considering inserting/updating/deleting existing sharing rows only rows with that unique group id need to be considered; when a CBS rule gets deleted, again just those sharing rows with the unique group id need be deleted.

In one embodiment, when an entity object is updated, all the CBS rules on that record are evaluated synchronously in the JAVA layer before they are committed the whole transaction. It is a process very similar to workflow. Therefore, in certain aspects, it may be desirable to not allow a very large number of CBS rules per entity, otherwise, it may slow down the save process of an entity object. Therefore in one aspect, a limit of 10-100 CBS rules per entity is used, although this number may of course be much greater.

UI

FIG. 6 illustrates a UI screen shot 600 for creating/editing a CBS rule. The top subsection 610 is for owner group membership test criterion; the second subsection 620 is for defining other criteria based on fields other than owner. In certain aspects, as discussed above, filter items defined in this section are converted to formula. Subsection 630 is the sharing target groups, one or multiple groups can be specified.

Data Model Example

Following is an exemplary CBS data model according to one embodiment.

```
-- CBSRuleOrgPermission
EXEC upgdata.uUpgradeUtils.set_bitvector_bit('core', 'organization', 'permissions', 232, FALSE);
-- CBS Rule, for custom object sharing rules
ALTER TABLE core.custom_share_default ADD (is_cbs_rule CHAR(1) DEFAULT '0' NOT NULL,
boolean_filter VARCHAR2(765), calculated_formula VARCHAR2(4000));
-- CBS Rule Item
-- CBS Rule Item, for custom object cbs rules, need key_prefix to make this an associate entity
BEGIN
    upgdata.uUpgradeUtils.create_partitioned_table('core', 'custom_cbs_filter_item',
        upgdata.sfdc_column_array(
            upgdata.uUpgradeUtils.table_column('organization_id',         'CHAR(15)', FALSE),
            upgdata.uUpgradeUtils.table_column('key_prefix',              'CHAR(3)', FALSE),
            upgdata.uUpgradeUtils.table_column('custom_cbs_filter_item_id',  'CHAR(15)', FALSE),
            upgdata.uUpgradeUtils.table_column('custom_share_default_id',  'CHAR(15)', FALSE),
            upgdata.uUpgradeUtils.table_column('table_enum_or_id',        'VARCHAR2(120)', FALSE),
            upgdata.uUpgradeUtils.table_column('column_enum_or_id',       'VARCHAR2(120)', FALSE),
            upgdata.uUpgradeUtils.table_column('operation',               'CHAR(1)', FALSE),
            upgdata.uUpgradeUtils.table_column('value',                   'VARCHAR2(3000)', FALSE),
            upgdata.uUpgradeUtils.table_column('sort_order',              'NUMBER', FALSE),
            upgdata.uUpgradeUtils.table_column('created_date',            'DATE', 'SYSDATE', FALSE),
            upgdata.uUpgradeUtils.table_column('created_by',              'CHAR(15)', FALSE),
            upgdata.uUpgradeUtils.table_column('last_update',             'DATE', 'SYSDATE', FALSE),
            upgdata.uUpgradeUtils.table_column('last_update by',          'CHAR(15)', FALSE),
            upgdata.uUpgradeUtils.table_column('system_modstamp',         'DATE', 'SYSDATE', FALSE),
            upgdata.uUpgradeUtils.table_column('row_version',             'NUMBER', '1', TRUE)
        ));
END;
/
EXEC upgdata.uUpgradeUtils.create_partitioned_index('pkcustom_cbs_filter_item', 'core',
'custom_cbs_filter_item', 'organization_id, custom_cbs_filter_item_id', 1);
EXEC upgdata.uUpgradeUtils.create_partitioned_index('akcustom_cbs_filter_item', 'core',
'custom_cbs_filter_item', 'organization_id, key_prefix, custom_share_default_id, sort_order', 3);
```

-continued

```
EXEC upgdata.uUpgradeUtils.create_partitioned_index('iecust_cbs_filter_item_sysmod', 'core',
'custom_cbs_filter_item', 'organization_id, key_prefix, system_modstamp', 2);
```

Deep Share

According to one embodiment, "Deep Share" provides the ability to share objects related to an object that is explicitly shared or which is identified based on evaluation of a CBS rule. Following are the different features around 'deep share' in order of importance.

In certain aspects, the customer has the ability to share related records when sharing a parent record. In certain aspects, a related object list is filtered based on which objects have been published across any active connection and then which objects are on the selected parent object. In one aspect, the number of objects and records are limited, e.g., up-to 20 related objects may be selected and 100 records per object may be shared. In one embodiment, the user needs to have Owner Type rights (R/W/T Access) to forward any record—this includes both parent and related records In one embodiment, objects should include a Parent Record field (e.g. Account: Acme) that gets populated when the record in question is shared as a child of the related record.

In one embodiment, the user/customer has the ability to choose if the related records should be automatically inserted when a parent record is accepted by the recipient(s). If this option has not been selected then the child records are inserted into the stage. If this option is selected but the 'child' object(s) has no relationship to the parent object in the target (recipient) organization's database then the record should be inserted into the stage for manual intervention. If this option is selected and the child object(s) has a master that is not the related object then the child record should be inserted into stage for manual intervention. If this option is selected and the child object(s) has two masters (or 2 fields related to the same parent) then the child record should be inserted into the stage for manual intervention. If this option is selected and the child object(s) are related to the parent (and the previous two conditions don't apply), then the child records should be inserted and automatically related to the parent record.

In one embodiment, if this setting is selected, multiple levels of deep share work. For Example:

Opportunity->Order->Line Items (automatic accept on Order and Line Item)

Opportunity Shared and Accepted by recipient at target organization

Sharing user in source organization uses the 'Forward' link on Orders Related list. Includes Line Items and Tasks and shares with target connection System sees that the parent opportunity for Orders is already shared. It next checks whether the 'Automatic Accept' indicator on Opportunities on the subscriber side is set=Yes.

It inserts the Order and relates to the Shared Opportunity and triggers an insert event for Line Items Event for Line Items checks if indicator on Order is set=YES—so the event automatically inserts and relates the line items to the order While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer implemented method for automatically sharing data between subscribers to a multi-tenant database service, the method comprising:

receiving a specification of at least one sharing rule from a first subscriber to a multi-tenant on-demand database service, the first subscriber being associated with a first organization that shares database resources of the multi-tenant on-demand database service with a second organization; and automatically evaluating the sharing rule to identify whether a data record of a first data object accessible to the first subscriber is to be shared with a second subscriber of the second organization that does not have access to the data record, and if so, automatically sharing the data record with the second subscriber;

wherein the automatically sharing the data record includes updating a second database object of the second subscriber to include a copy of the data record;

wherein the automatically sharing data includes:
 (a) synchronizing the copy of the data record in the second database object with the data record of the first database object: and
 (b) sending a notification to the second subscriber, and sharing the data record responsive to an indication of acceptance from the second subscriber; and wherein the synchronizing includes automatically updating the copy of the data record in the second database object responsive to the data record of the first database object being modified by the first subscriber.

2. The computer implemented method of claim 1, wherein synchronizing includes automatically updating the copy of the data record in the second database object responsive to the data record being modified in the first database object in response to a workflow rule, or a trigger.

3. A computer implemented method for automatically sharing data between subscribers to a multi-tenant database service, the method comprising:

receiving a request to share data of a first subscriber to an on demand database service with at least one second subscriber to the on-demand database service, the request including at least one rule, wherein the first subscriber and second subscriber do not share access to the others data;

automatically determining whether a data record accessible by the first subscriber is to be shared with the second subscriber based at least in part on application of the at least one rule, and if so, automatically sharing the data record of the first subscriber with the at least one second subscriber;

wherein the automatically sharing data includes:
 (a) synchronizing the copy of the data record in the database object of the second subscriber with the data record of the first subscriber; and
 (b) sending a notification to the second subscriber, and sharing the data record responsive to an indication of acceptance from the second subscriber; and wherein the synchronizing includes automatically updating the copy of the data record in the database object of the second subscriber responsive to the data record of the first subscriber being modified by the first subscriber.

4. The computer implemented method of claim 3, wherein sharing includes updating a sharing table that includes pointers to records stored in relation to pointers to subscribers.

5. The computer implemented method of claim 3, wherein sharing includes updating a database object of the second subscriber to include a copy of the data record.

6. A tangible computer readable medium that stores code for automatically sharing data between subscribers to a multi-tenant database service, the code including instructions, implemented by one or more processors, to:

receive a specification of at least one sharing rule from a first subscriber to a multi-tenant on-demand database service, the first subscriber being associated with a first organization that shares database resources of the multi-tenant on-demand database service with a second organization;

automatically evaluate the sharing rule to identify whether a data record of a first data object accessible to the first subscriber is to be shared with a second subscriber of the second organization that does not have access to the data record, and if so, automatically share the data record with the second subscriber;

wherein the computer readable medium includes instructions to synchronize the copy of the data record in the second database object with the data record of the first database object; and wherein the instructions to automatically share include instructions to:

update a second database object of the second subscriber to include a copy of the data record; and send a notification to the second subscriber, and to share the data record responsive to an indication of acceptance from the second subscriber; and wherein the instructions to synchronize include instructions to automatically update the copy of the data record in the second database object responsive to the data record of the first database object being modified by the first subscriber.

7. The computer readable medium of claim 6, wherein the instructions to share include instructions to update a sharing table that includes pointers to records stored in relation to pointers to subscribers.

8. The computer readable medium of claim 6, wherein the instructions to synchronize include instructions to automatically update the copy of the data record in the second database object responsive to the data record being modified in the first database object in response to a workflow rule, or a trigger.

9. A multi-tenant on demand database system, comprising:

a database that stores database objects for a plurality of organizations/tenants, wherein users of each tenant only have access to data base objects associated with that tenant; and a server configured with control logic, which when executed, causes the server to:

receive a specification of at least one sharing rule from a first subscriber to a multi-tenant on-demand database service, the first subscriber being associated with a first organization that shares database resources of the multi-tenant on-demand database service with a second organization; and automatically evaluate the sharing rule to identify whether a data record of a first data object accessible to the first subscriber is to be shared with a second subscriber of the second organization that does not have access to the data record, and if so, automatically share the data record with the second subscriber;

wherein the automatically sharing the data record includes updating a second database object of the second subscriber to include a copy of the data record;

wherein the control logic includes control logic, which when executed, causes the server to:

(a) synchronize the copy of the data record in the second database object with the data record of the first database object: and (b) send a notification to the second subscriber, and sharing the data record responsive to an indication of acceptance from the second subscriber; and wherein the synchronizing includes automatically updating the copy of the data record in the second database object responsive to the data record of the first database object being modified by the first subscriber.

* * * * *